US012717444B2

(12) United States Patent
Seo et al.

(10) Patent No.: US 12,717,444 B2
(45) Date of Patent: Aug. 25, 2026

(54) METHOD AND APPARATUS HAVING A VARIABLE DETECTION AREA FOR DETECTING A POSITION OF AN OBJECT

(71) Applicant: HYUNDAI MOBIS CO., LTD., Seoul (KR)

(72) Inventors: Jun Seong Seo, Yongin-si (KR); Sung Hyun Park, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/515,409

(22) Filed: Nov. 21, 2023

(65) Prior Publication Data

US 2024/0241606 A1 Jul. 18, 2024

(30) Foreign Application Priority Data

Jan. 13, 2023 (KR) ........................ 10-2023-0005510

(51) Int. Cl.
*G06F 3/042* (2006.01)
*G06F 3/041* (2006.01)

(52) U.S. Cl.
CPC ............ *G06F 3/042* (2013.01); *G06F 3/0414* (2013.01)

(58) Field of Classification Search
CPC ...... G06F 3/042; G06F 3/0414; G06F 3/0421; G06F 3/04842; G06F 3/0482
See application file for complete search history.

(56) References Cited

U.S. PATENT DOCUMENTS

2015/0301688 A1* 10/2015 Cho ...................... G06F 3/0446 345/175
2017/0277323 A1* 9/2017 Kim ...................... G06F 3/0446
2017/0308173 A1* 10/2017 Youn ........................ G01V 8/20
2018/0217670 A1* 8/2018 Cho ...................... G06F 3/0446
2019/0004614 A1* 1/2019 Mori ....................... B60R 16/02
2023/0004230 A1* 1/2023 Pegorier ................. G06F 3/017

FOREIGN PATENT DOCUMENTS

KR 10-2013-0049562 A 5/2013
KR 2022-0131718 A 9/2022

* cited by examiner

*Primary Examiner* — Scott D Au
(74) *Attorney, Agent, or Firm* — NovoTechIP International PLLC

(57) ABSTRACT

A method and apparatus are provided for detecting a position of an object using a position detecting device having a variable detection area. In one implementation, a method of detecting an position of the object includes determining a sensing area used to detect the position of the object from an entire area that is formed by a sensor having a plurality of linearly arranged sensing elements and in which the position of the object may be detected, visualizing the sensing area using a light-emitting element, detecting the position of the object in the sensing area, and displaying the detected position of the object on a display screen. The detection result of the position of the object is reflected on the display screen according to a ratio of a horizontal length of the display screen to a horizontal length of the sensing area.

10 Claims, 9 Drawing Sheets

METHOD AND APPARATUS HAVING A VARIABLE DETECTION AREA FOR DETECTING A POSITION OF AN OBJECT

The present application claims priority to Korean Patent Application No. 10-2023-0005510 filed Jan. 13, 2023, the entire contents of which is incorporated herein for all purposes by this reference.

TECHNICAL FIELD

The present invention relates to a position detection apparatus, and more particularly, to an apparatus for detecting a position of an object using a position detection device having a variable detection area according to user settings.

BACKGROUND

Optical sensor technology tracks an object's direction or coordinates by emitting light from a light emitter and sensing a returning signal of the reflected light by a receiver. In recent years, technology for sensing the position of an object by measuring the time it takes for light to be emitted, reflected, and received has been developed. Using this technology, it is possible to implement a technology that allows the popping-up of a menu in the area pointed to with a finger by detecting the position of the finger pointing from a position close to a display screen.

However, a typical optical sensor usually emits light in the vertical direction from the bottom to the top in front of the display. Accordingly, it is possible to detect the relative position of a finger with respect to the display screen when the finger is close to the display. However, sensing becomes difficult when the finger moves even slightly away from the display screen.

On the other hand, using these optical sensor technologies, remote control capabilities for a navigation system, a multimedia system, an air conditioner, and the like located on a center fascia of a vehicle have been developed recently. The optical sensor technology allows drivers to control a navigation system and other features without directly touching the screen or buttons so that more comfortable operation is made possible and the risk of traffic accidents may be reduced. However, the limited arm's reach by the driver restricts the sensing area in the wide area of the center fascia. If the sensing area is set only to the area close to the driver's seat in consideration of the driver alone, it may inconvenience the front-seat passenger who may also need to operate the system.

Therefore, there is a need for position detection technology that allows drivers and front-seat passengers to operate a navigation system and other features safely and conveniently.

SUMMARY

An object of the present invention is to provide a position detection method and apparatus that allow drivers to operate buttons safely without looking down while driving.

Another object of the present invention is to provide a position detection method and apparatus that allow the short maneuvering range of the drivers' arm to cover the entire range of menus on the monitor so that the drivers can operate buttons comfortably without overstretching their arms.

According to an embodiment of the present invention for realizing the objects described above, a method of detecting an object's position, performed by a position detection apparatus, includes determining a sensing area used to detect the object's position from the entire area that is formed by a sensor having a plurality of linearly arranged sensing elements and in which the object's position may be detected, visualizing the sensing area using a light-emitting element, detecting the object's position in the sensing area, and displaying the detected object's position on a display screen, in which the sensitivity with which the detection result of the object's position is reflected on the display screen is set based on the ratio of the horizontal length of the display screen to the horizontal length of the sensing area.

At this time, the acquiring information about the sensing area may be performed by acquiring pre-stored information about the sensing area from memory.

At this time, the acquiring information about the sensing area may be performed by providing an input and output interface that allows the selection of the sensing area on the display screen and receiving information about the sensing area through user input.

At this time, the visualizing the sensing area may be performed by the light-emitting element emitting light only in the area corresponding to the sensing area.

At this time, the visualizing the sensing area may be performed by the light-emitting element emitting light in different colors in the sensing area and the area other than the sensing area.

At this time, the position detection method may further include determining whether an input is received through a physical button integrally provided with a sensor having a plurality of linearly arranged sensing elements and performing a function that matches the detected object's position when an input is received through the physical button.

At this time, in the determining whether an input is received through a physical button, it is determined that an input is received through the physical button when the user presses the physical button with a force equal to or greater than a threshold pressure.

At this time, the function that matches the detected object's position may be determined by the object's position immediately before an input is received through the physical button.

At this time, the applying the detected object's position to the display screen may include activating one of at least one menu icon according to the detected object's position on the display screen on which the at least one menu icon is displayed, and the execution of the function that matches the detected object's position may be performed by executing an application that matches the activated menu icon.

At this time, the activating one of the at least one menu icon may be performed by changing the shape or color of the one of the at least one menu icon.

On the other hand, according to an embodiment of the present invention, a position detection apparatus includes a display portion displaying information on a screen, a sensor portion using all or a part of the entire area, which is formed by a sensor having a plurality of linearly arranged sensing elements and in which the object's position may be detected, as a sensing area for detecting the object's position, a light-emitting element visualizing the sensing area, and a processor acquiring information about the sensing area and controlling the display portion to display the detected object's position on the screen, in which the sensitivity with which the detection result of the object's position is reflected on the screen is determined based on the ratio of the horizontal length of the screen to the horizontal length of the sensing area.

At this time, the processor may acquire pre-stored information about the sensing area from memory.

At this time, the processor may provide an input and output interface that allows the selection of the sensing area on the screen and receive information about the sensor area through user input.

At this time, the light-emitting element may visualize the sensing area by emitting light only in the area corresponding to the sensing area.

At this time, the light-emitting element may visualize the sensing area by emitting light in different colors in the sensing area and the area other than the sensing area.

At this time, the processor may determine whether an input is received through a physical button integrally provided with a sensor having a plurality of linearly arranged sensing elements and perform a function that matches the detected object's position when an input is received through the physical button.

At this time, the processor may determine that an input is received through the physical button when the user presses the physical button with a force equal to or greater than the threshold pressure.

At this time, the function that matches the detected object's position may be determined by the object's position received immediately before an input is received through the physical button.

At this time, the processor may activate one of at least one menu icon according to the detected object's position on a display screen on which the at least one menu icon is displayed and perform the function that matches the detected object's position by executing an application that matches the activated menu icon.

At this time, the processor may activate one of the at least one menu icon by changing the shape or color of the one of the at least one menu icon.

The various embodiments of the present invention allow drivers to operate buttons safely without looking down while driving.

Further, the short maneuvering range of the driver's arm covers the entire range of the menus on the monitor so that the driver can operate buttons comfortably without overstretching the arm.

The effects obtainable from the present invention are not limited to the effects mentioned above, and other effects not mentioned will be clearly understood by those skilled in the art to which the present invention pertains from the following description

DETAILED DESCRIPTION

Figure 1:
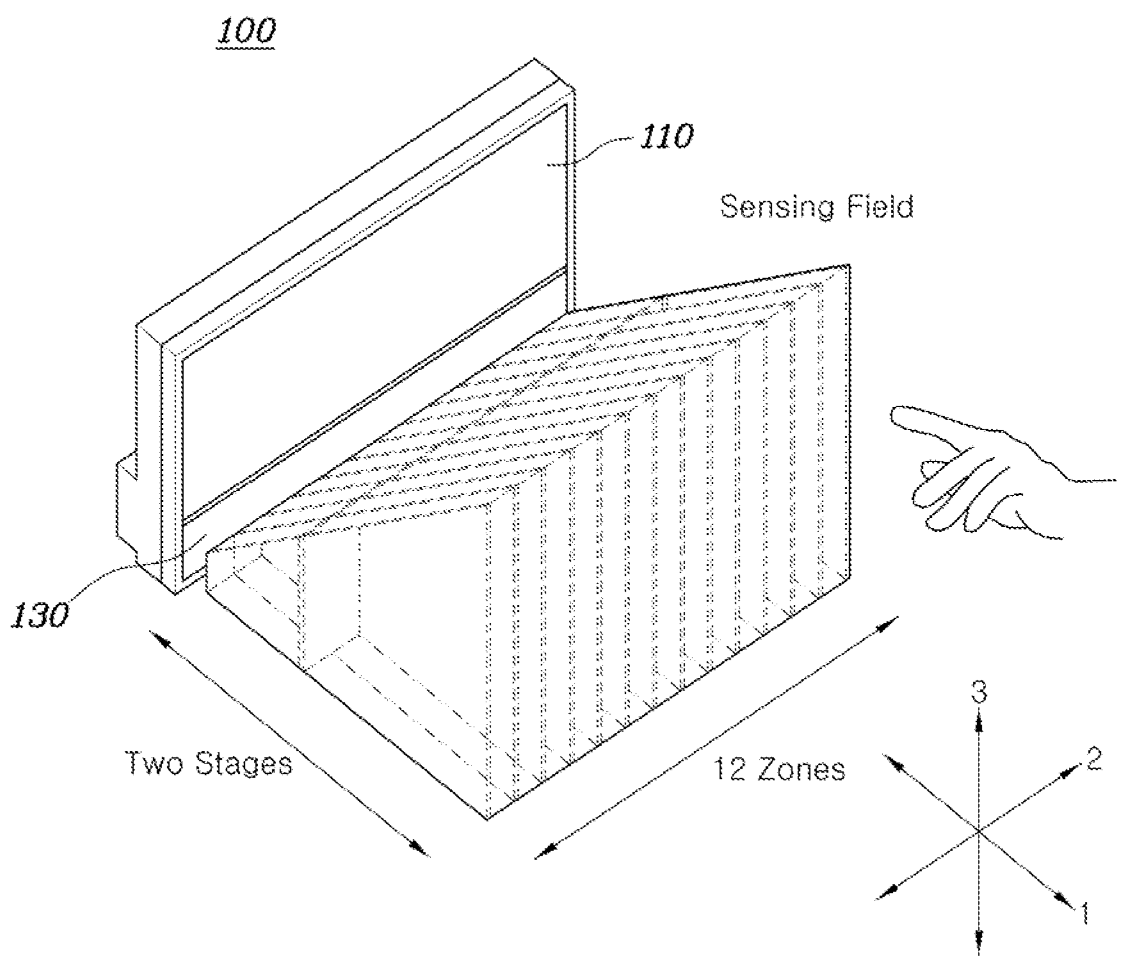
FIG. 1 illustrates a position detection apparatus according to an embodiment of the present invention.

Hereinafter, embodiments disclosed in the present invention will be described in detail with reference to the accompanying drawings, but the same reference numerals will be assigned to the similar or same components regardless of drawing numbers and repetitive descriptions will be omitted. The suffixes "module" and "unit" for the components used in the following description are given or interchangeably used only to facilitate the writing of the specification, without necessarily indicating a distinct meaning or role of their own. Further, when it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present invention.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

FIG. 1 illustrates a position detection apparatus according to an embodiment of the present invention.

FIG. 1 shows that the position detection apparatus 100 according to the present embodiment may include a display portion 110 and a sensor portion 130.

The display portion 110 displays information on a screen.

For example, the display portion 110 may have a rectangular display area having a major axis extending in the direction of one axis (here, a second axis) and a minor axis extending in the direction of the other axis (here, a third axis) intersecting the one axis. However, this is only an example and the display portion is not limited thereto. For example, the shape of the display area may be polygonal, circular, or elliptical rather than rectangular, the major and minor axis directions may be opposite each other, or the shape may be square with no distinction between the major and minor axes.

Further, the display portion 110 may be a display screen of an audio, video, and navigation (AVN) system disposed between a driver's seat and a front passenger seat. For example, the display portion 110 may display a multimedia playback screen, a navigation screen for providing route guidance to a driver in the vehicle, or a user interface for setting up various functions of the vehicle, among others.

In addition, the display portion 110 may be implemented as a touchscreen formed in a layered structure with a touch sensor or integrally formed therewith. The touchscreen may serve as a user input portion providing an input interface to a user and as a user output portion providing an output interface to the user at the same time.

The display portion 110 may include at least one of a liquid crystal display (LCD), a thin film transistor-liquid crustal display (TFT LCD), an organic light-emitting diode (OLED), a flexible display, a three-dimensional display (3D display), and an e-ink display, but is not limited to these examples.

The sensor portion 130 extends in one direction (here, the second axis direction) in which the display portion 110 extends and is disposed alongside the display portion 110 to sense the presence, position, and movement of objects approaching the display portion 110. The sensor portion 130 may be referred to as a "linear sensor" based on its shape.

The linear sensor 130 includes at least one linearly arranged light-emitting means and a plurality of linearly arranged light-receiving means.

At this time, when an object such as a finger (hereinafter, for convenience of description, a sensed object is assumed to be a finger) approaches the display portion 110, the linear sensor 130 can sense a finger approaching the display portion 110 by utilizing the principle that the light (for example, an infrared ray) emitted from the light-emitting means is reflected from the finger and received by the light-receiving means. A specific arrangement of the light-emitting and light-receiving means will be described with reference to FIG. 3 below.

The linear sensor 130 may be provided separately or away from the display portion 110, may be disposed in contact with the bottom of the display portion 110 as illustrated in FIG. 1, or may be embedded inside the display portion 110, for example integrally embedded behind a cover glass covering the screen of the display portion 110.

On the other hand, the light-emitting means may be disposed such that the sensing area (that is, sensing field) of the linear sensor 130 is formed within a certain area in front of the screen of the display portion 110. In other words, the light-emitting means may be disposed such that the light emission direction includes at least a first axis direction. Further, when the light-emitting means emits light fanwise, the sensing field may expand in the third direction as the light further reaches out from the display portion 110 screen. In addition, the sensing field may be divided into a plurality of stages depending on the distance from the front of the display portion 110 screen, that is, the distance from the display portion 110 screen in the first axis direction, and may be divided into a plurality of zones in one extending direction (here, the second axis direction) of the display portion 110. For example, the sensing field may be divided into 2 stages in the first axis direction and 12 zones in the second axis direction but is not limited to this example. In addition, the size of the sensing field may be diversely set based on the light emission intensity and emission angle of the light-emitting means, light reception sensitivity of the light-receiving means, arrangement patterns and the number of the light-emitting and light-receiving means, and the like.

Compared to the typical position detection apparatus provided with the sensing field in the vertical direction with respect to the display screen, the sensing field of the linear sensor 130 in the position detection apparatus 100 according to the present embodiment expands as the sensing field reaches out farther from the display portion 110 screen so that the finger approaching the front of the display portion 110 from afar as well as the finger in the vicinity of the display portion 110 can be sensed.

Figure 2:
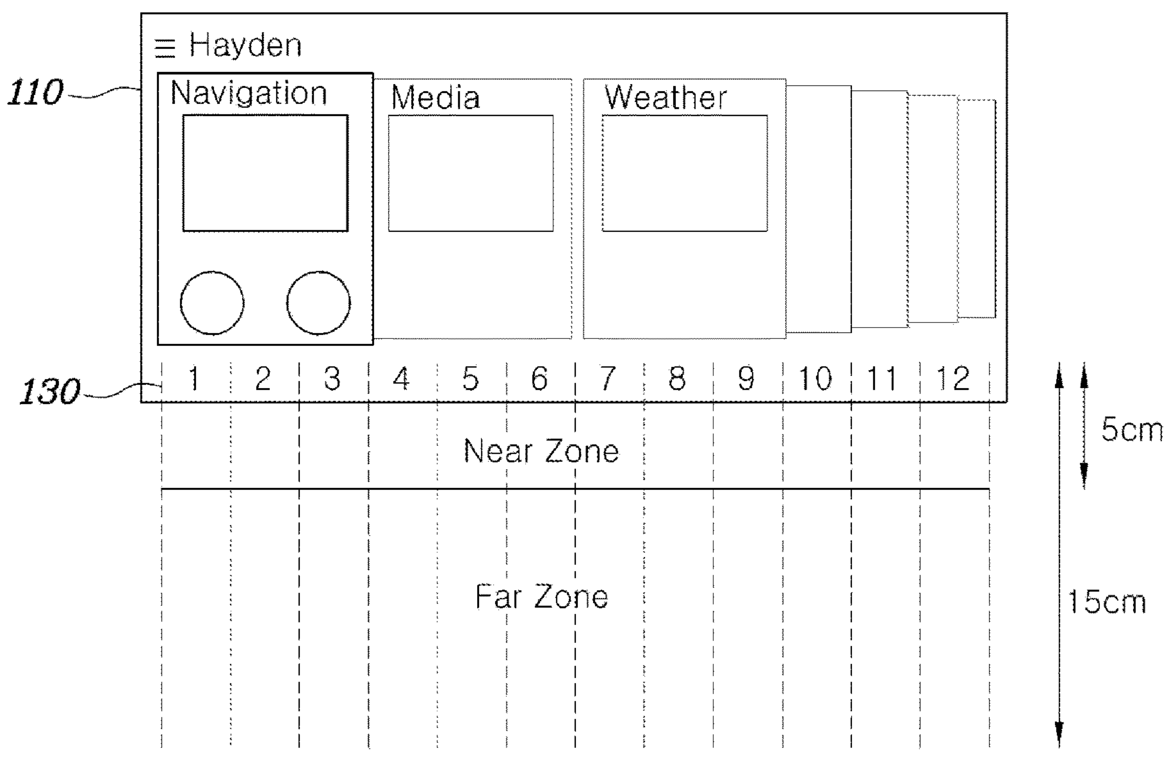
FIG. 2 illustrates an example of a sensing area of a display portion in the position detection apparatus in FIG. 1.
Figure 2:
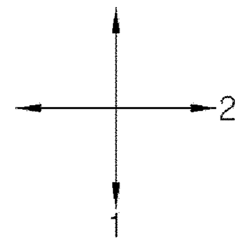

FIG. 2 illustrates an example of a sensing area of a display portion of the position detection apparatus in FIG. 1.

FIG. 2 shows that the sensing area of the linear sensor 130 may be divided into 12 zones in the second axis direction. The number of sensing areas may be diversely adjusted depending on the configurations of the light-emitting and light-receiving means forming the linear sensor 130 as described above.

The position detection apparatus 100 may determine to which zone the finger approaching the display portion 110 belongs and provide or modify a user interface (for example, pop-up a detailed menu, display information, and the like) through the display portion 110 in response to the determined zones. For example, as illustrated in FIG. 2, the sensing area may be made of 12 zones from no. 1 to no. 12 from left to right in the second axis direction. Here, the position detection apparatus 100 may execute (or enlarge, activate, pop-up, and the like) the navigation menu when the finger is positioned in zones no. 1 to no. 3, execute the media menu when the finger is positioned in zone no. 4 to no. 6, and execute the weather menu when the finger is positioned in the zones no. 7 to no. 9.

Further, the position detection apparatus 100 may measure how close the finger is to the linear sensor 130 based on the light-receiving intensity. For example, the position detection apparatus 100 may determine the finger to be in a near zone when the finger is within 5 cm from the linear sensor 130 and in a far zone when the finger is between 5 cm to 15 cm from the linear sensor. At this time, the position detection apparatus 100 may be configured to perform different operations depending on whether the finger is positioned in the near zone or the far zone. For example, the position detection apparatus 100 may be set to highlight the selected menu on the display screen by applying visual effects such as zooming in or color changes when the finger is in the far zone and execute the selected menu when the finger is positioned in the near zone.

In addition, the position detection apparatus 100 may change the arrangement state of the menu depending on the area in which the finger is first sensed (not shown). For example, the provided menu may concentrate on the left when the finger is first detected in zone no. 1 and on the right when the finger is first detected in zone no. 12.

Figure 3:
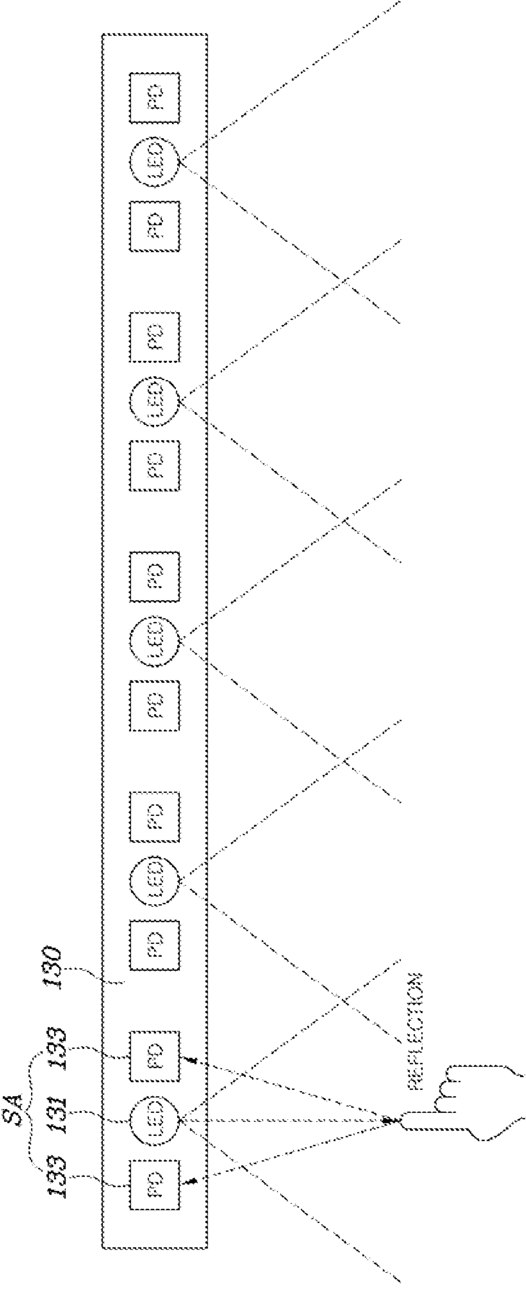
FIG. 3 illustrates a linear sensor module according to an embodiment of the present invention.

FIG. 3 illustrates a linear sensor module according to an embodiment of the present invention.

FIG. 3 shows that the linear sensor module 130 according to the present invention may have sensor arrays (SA), which include a light-emitting element 131 and light-receiving elements 133, spaced apart by predetermined intervals. For example, as illustrated in FIG. 3, the sensor array (SA) may have an arrangement pattern, where the light-emitting element 131 is disposed at the center and the light-receiving elements 133 are respectively disposed on either side of the light-emitting element 131 but is not limited to this example.

The light-emitting element 131 emits light, and the light-receiving element 133 can sense it when the light emitted from the light-emitting element 131 is reflected from an object and incident on the light-receiving element 133. To this end, the light-emitting element 131 may include a light-emitting diode (LED), and the light-receiving element 133 may include a photodiode (PD). Preferably, the light-emitting element 131 may be an IR LED emitting infrared rays. If the light-emitting element 131 is the IR LED, the user's visual discomfort in looking at the display portion 110 may be prevented, especially when considering the direction and shape of the sensing field's formation.

The position detection apparatus 100 may continuously and simultaneously operate the light-emitting elements 131 provided in each sensor array (SA) or may operate only a part (for example, one) of the light-emitting elements 131 at a given moment using a time-division method. Employing the time-division method can help save power consumption for sensing and reduce optical interference caused by simultaneous light emission of the adjacent light-emitting elements 131.

On the other hand, the number of SAs may be the same as or different from the number of sensing areas. For example, when the sensing field is divided into 12 zones in the second axis direction, 12 SAs may be employed such that one SA corresponds to one zone. In another example, as illustrated in FIG. 3, the light emission zone of an individual SA at least partially overlaps the light emission zones of the adjacent SAs, but fewer sensor arrays than the zones of the sensing field may be employed. In this case, a greater number of sensing areas than the SAs may be provided by collectively determining the relative intensity of the light sensed by the light-receiving elements 133 in each of the plurality of SAs.

Figure 4:
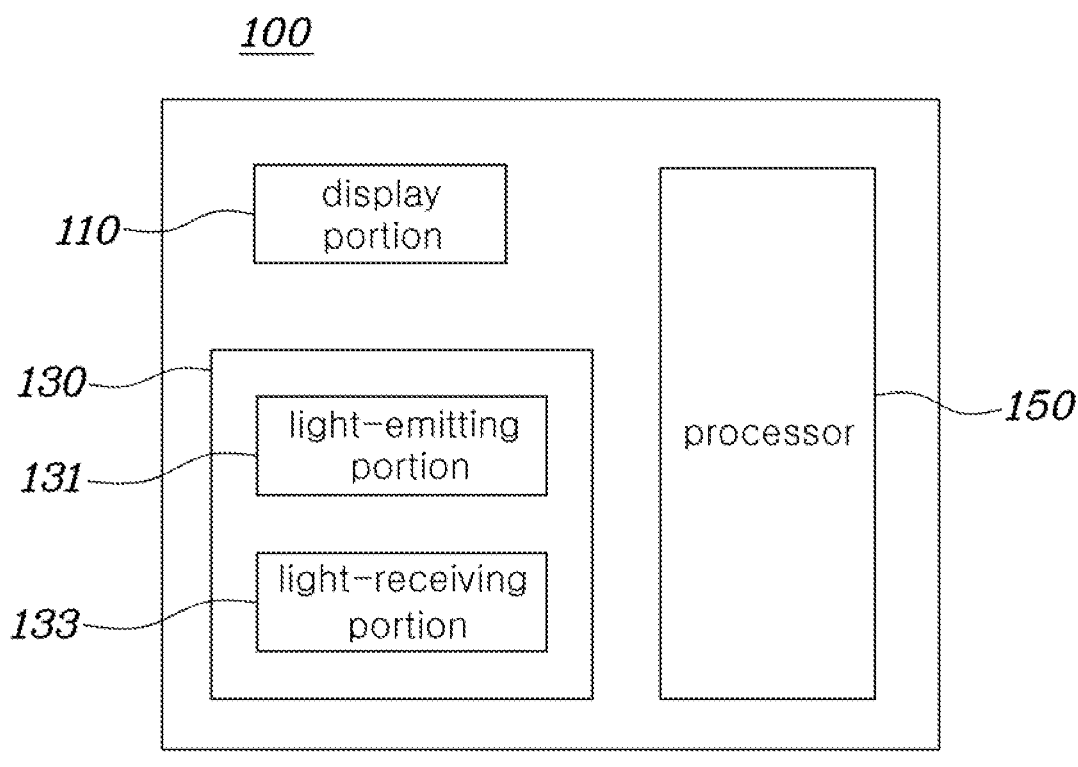
FIG. 4 is a block diagram illustrating a configuration of a position detection apparatus according to an embodiment of the present invention.

FIG. 4 is a block diagram illustrating a configuration of the position detection apparatus 100 according to an embodiment of the present invention.

FIG. 4 shows that the position detection apparatus 100 according to the present embodiment may include the display portion 110, a position detection sensor 130, and a processor 150. FIG. 4 mainly illustrates components related to the embodiment of the present invention. It is to be understood that the position detection apparatus 100 may include more components.

The configuration and function of the display portion 110 and the linear sensor 130 are the same as the above description, so repetitive descriptions will be omitted and the function of the processor 150 will be described below.

In particular, the processor 150 receives a light sensing signal of the light-receiving element from the linear sensor 130, determines in which zone and area in the sensing field the finger is sensed based thereon, and may control the display portion 110 based thereon. For example, the processor 150 may determine to which zone and area in the sensing field the finger approaching the display portion 110 belongs and pop-up relevant detailed menu or display relevant information.

The processor 150 may typically control the overall operations of the position detection apparatus 100 in addition to the operations related to the object sensing in the sensing field. For example, the processor 150 may provide users with appropriate information or perform functions by processing signals, data, information, and the like inputted or outputted through the components described above or running application programs stored in memory (not shown).

Further, the processor 150 may control at least a part of the components described thus far to run application programs stored in memory. Further, the processor 150 may combine two or more components included in the position detection apparatus 100 to run the application programs.

On the other hand, the linear sensor 130 is disposed in contact with the bottom of the display portion 110 in the position detection apparatus 100 described above. However, according to another embodiment of the present invention, the display portion and the linear sensor may be disposed separately. Further, the entire area in front of the linear sensor 130 is fixed in the linear sensor 130 described above, while the sensing area can change according to the another embodiment.

Figure 5:
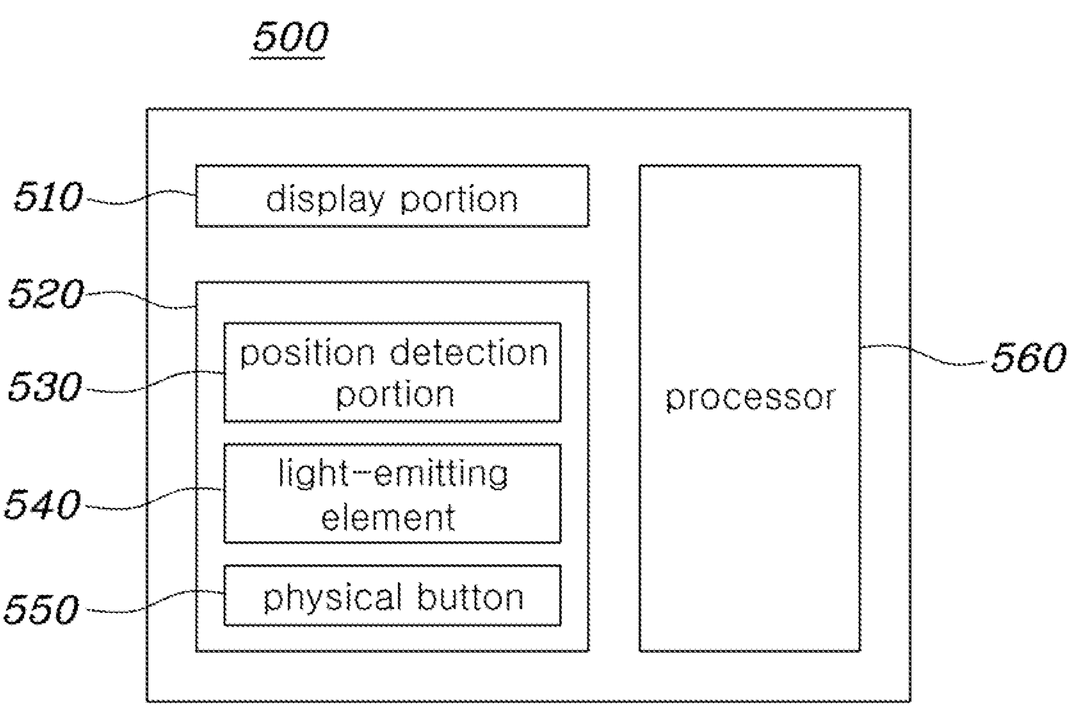
FIG. 5 is a block diagram illustrating a configuration of a position detection apparatus according to another embodiment of the present invention.

FIG. 5 is a block diagram illustrating a configuration of the position detection apparatus according to the another embodiment of the present invention.

FIG. 5 shows that a position detection apparatus 500 according to the present embodiment may include a display portion 510, a sensor portion 520, and a processor 150.

The configuration and function of the display portion 510 are the same as those of the display portion 110 in the embodiment described above.

The sensor portion 520 may be disposed spaced apart from the display portion 510 and includes a position detection portion 530, a light-emitting element 540, and a physical button 550.

Figure 6:
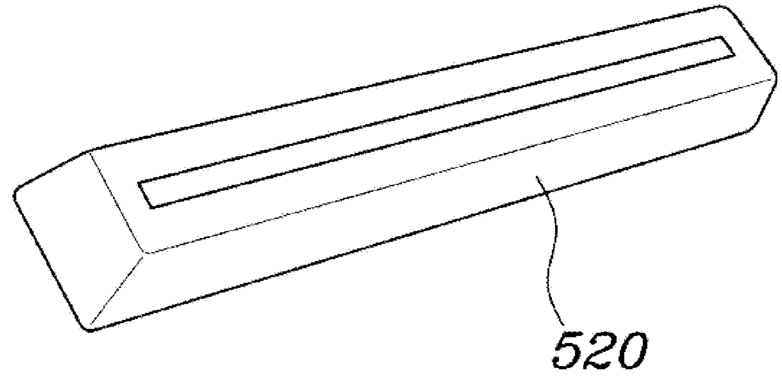
FIG. 6 illustrates an example of a sensor portion in the position detection apparatus in FIG. 5.

For example, the sensor portion 520 may be provided in the shape of a rectangular rod as illustrated in FIG. 6.

The position detection portion 530 senses the presence, position, and movement of an object approaching in front, and the position detection portion 530 may have the same configuration and function as the linear sensor 110 in the embodiment described above.

The position detection portion 530 includes at least one linearly arranged light-emitting means and a plurality of linearly arranged light-receiving means.

At this time, when an object such as a finger (hereinafter, for convenience of description, a sensed object is assumed to be a finger), approaches in the front, the position detection portion 530 can sense the finger approaching the sensor portion 520 by utilizing the principle that the light (for example, an infrared ray) emitted from the light-emitting means is reflected from the finger and received by the light-receiving means.

The light-emitting and light-receiving means may be defined as sensing elements in the present specification.

Figure 7:
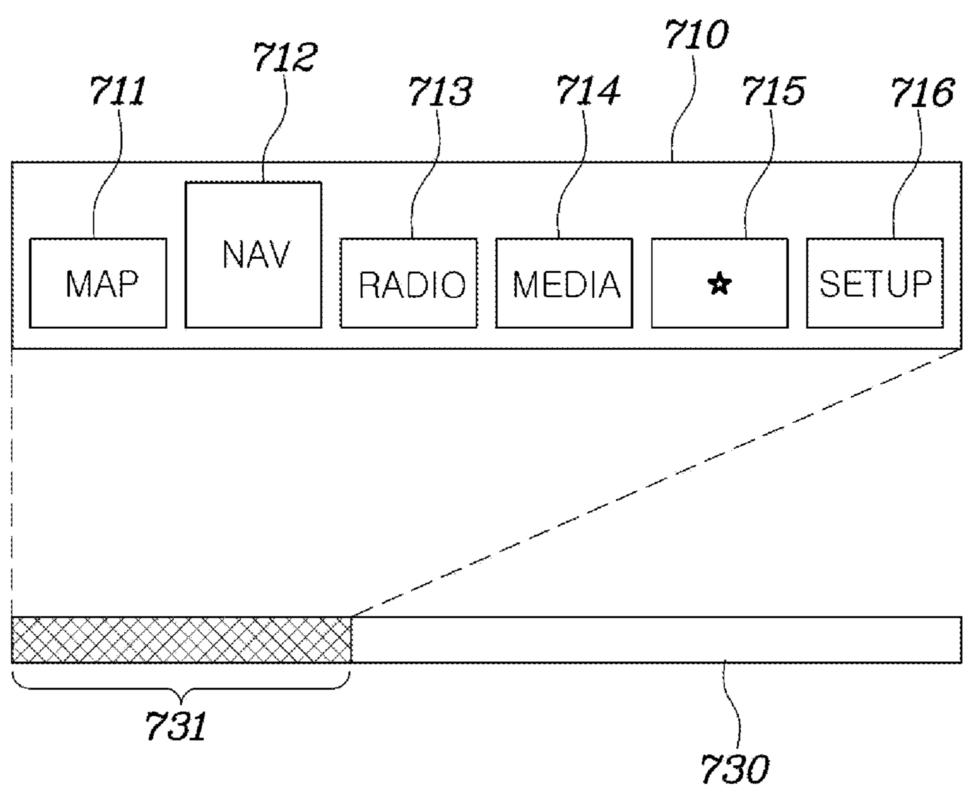
FIG. 7 illustrates an embodiment in which the position detection apparatus in FIG. 5 is implemented.

On the other hand, FIG. 7 shows that the position detection portion 530 may be set to use only a part of the entire area 730, in which an object's position may be detected, as a sensing area 731.

At this time, the horizontal length of the display screen 710 may be different from the horizontal length of the sensing area 731, and the sensitivity with which the position detection result of the object's position is reflected on the display screen may be set based on the ratio of the horizontal length of the sensing area 731 to the horizontal length of the entire display screen 710.

For example, when a finger is positioned in front of the left end of the sensing area 731, a pointer (not shown) for selecting an on-screen menu icon may point to the left end of the display screen 710. Similarly, when a finger is positioned in front of the right end of the sensing area 731, the pointer may point to the right end of the display screen 710. Further, when the finger is positioned in front of the center of the sensing area 731, the pointer may point to the center of the display screen 710.

At this time, the pointer may have various shapes and may be configured in an arrow shape, for example.

At this time, information about the menu pointed to by the finger may be displayed by changing the shape or color of the menu icon forming the display screen 710, without the pointer being displayed on the screen.

For example, every time the user's finger moves right or left in the sensing area 731, one of a plurality of menu icons 711, 712, 713, 714, 715, 716 may increase in size and change colors. For example, when the finger is positioned in an area corresponding to a NAV menu icon 712 in the sensing area 731, the NAV menu icon 712 may increase in size and change its colors as illustrated in FIG. 7. Changing a shape or color of a menu icon is defined as being 'activated' in the present specification.

The light-emitting element 540 visualizes the sensing area 731 for easy identification from the outside of the sensor portion 520. For example, the light-emitting element 540 may emit light only in the area corresponding to the sensing area 731 or may emit light throughout the entire area 730 in which the position detection portion 530 is configured. However, the sensing area 731 may be visualized by having the light-emitting element 540 that emits light in the sensing area 731 emit light in the area other than the sensing area 731 in a color different from the color of the sensing area 731.

At this time, the light-emitting element 540 described above may include a light-emitting diode (LED).

The physical button 550 is embedded inside the sensor portion 520 and is integrally provided with a sensor having a plurality of linearly arranged sensing elements physically, that is, the position detection portion 530.

At this time, the physical button 550 may be set to execute a function that matches the position of the finger when the user presses the sensor portion 530 with a force equal to or greater than a threshold pressure.

At this time, the function that matches the detected object's position may be determined by the position of the finger immediately before an input is received through the physical button. For example, FIG. 7 shows that the navigation application may be set to be executed when an input is received through the physical button 550 while the NAV menu icon 712 is activated as a result of the position detection of the finger.

Figure 8:
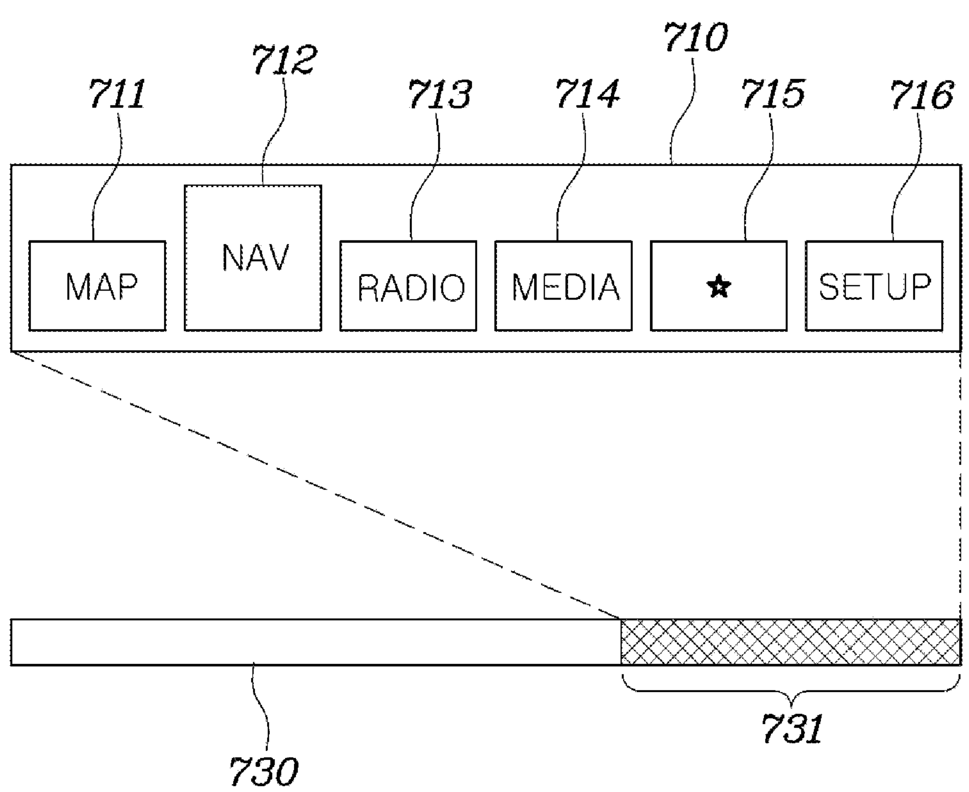
FIG. 8 illustrates another embodiment in which the position detection apparatus in FIG. 7 is implemented.

On the other hand, the sensing area 731 is positioned at the left end of the entire area 730 in which the position detection portion 530 is configured in the embodiment in FIG. 7. However, as illustrated in FIG. 8, the sensing area 731 may be positioned at the right end of the entire area 730 in which the position detection portion 530 is configured such that the finger may point a specific area on the display screen 710 from the front of the sensing area 731. Further, the position or the size of the sensing area 731 may be variably set within the entire area 730 by the user setting, and the variably set area may be distinguished by the light emitted from the light-emitting element 540 or its color.

The processor 560 may receive a light sensing signal of the light-receiving element from the position detection portion 530, determine in which zone and area in the sensing field the finger is sensed based thereon, and control the display portion 510 based thereon. For example, the processor 560 may determine to which zone and area in the sensing field the finger approaching the display portion 510 belongs and pop-up relevant detailed menu or display relevant information.

The processor 560 may typically control the overall operations of the position detection apparatus 500 in addition to the operations related to the object sensing in the sensing field. For example, the processor 560 may provide users with appropriate information or performs functions by processing signals, data, information, and the like inputted or outputted through the components described above or running application programs stored in memory (not shown).

Further, the processor 560 may control at least a part of the components described thus far to run application programs stored in memory. Further, the processor 560 may combine two or more components included in the position detection apparatus 500 to run the application programs.

The processor 560 may variably set the sensing area 731 used within the entire area 730. For example, the processor 560 may set an area at the left end of the entire area 730 in which the position detection portion 530 is configured, as illustrated in FIG. 7, to be the sensing area 731 in a first mode, set an area at the right end of the entire area 730, as illustrated in FIG. 8, to be the sensing area 731 in a second mode, and set the entire area 730 to be the sensing area 731 in a third mode.

At this time, the processor 560 may set the area in which an object is first sensed in the entire area 730 as a sensing area. For example, the first mode may operate when an object approaches from the right end, and the second mode may operate when an object approached from the left end.

Figure 9:
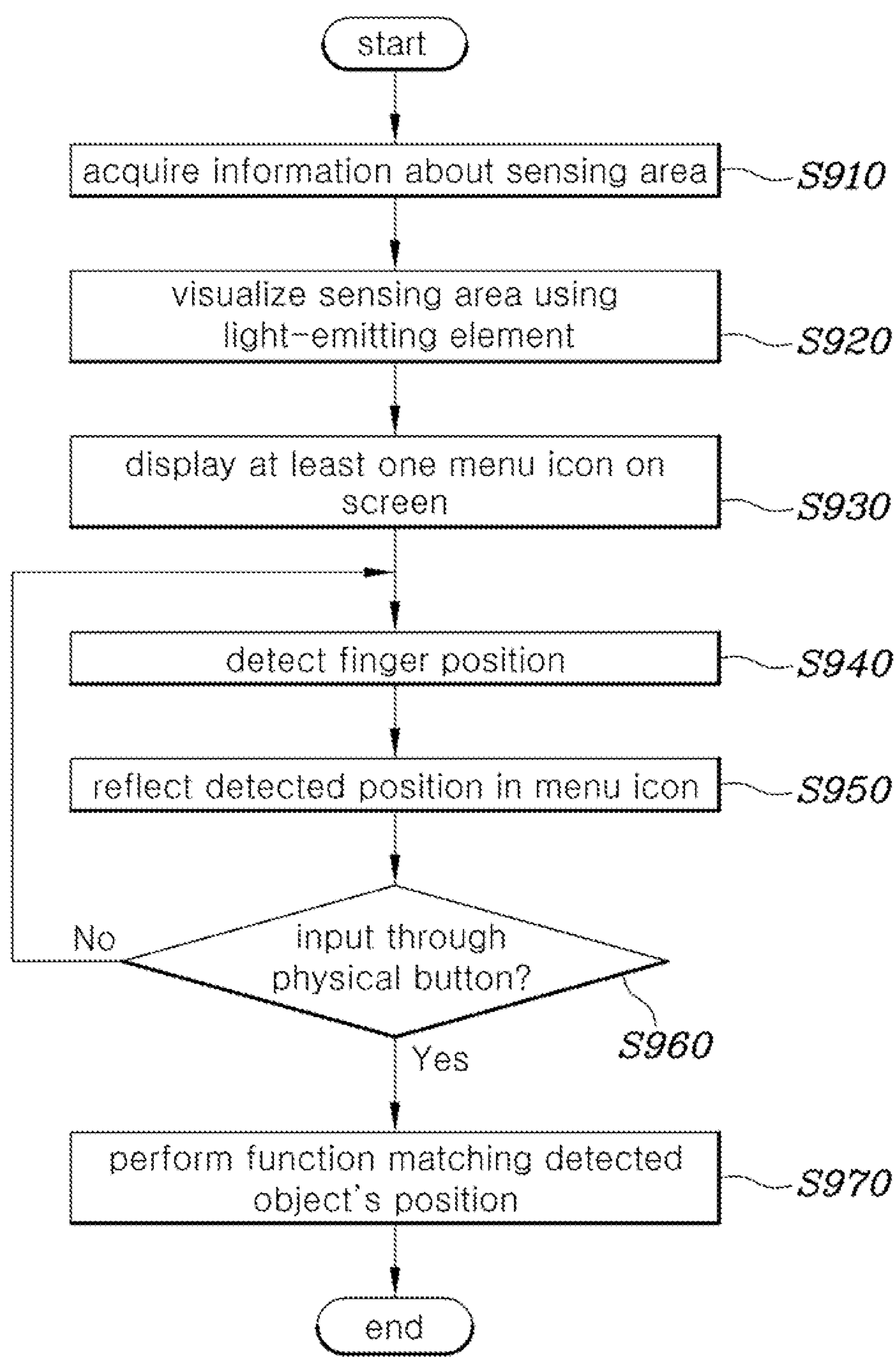
FIG. 9 illustrates a method of recognizing a finger by a position detection apparatus according to an embodiment of the present invention.

FIG. 9 illustrates a method of recognizing a finger position by a position detection apparatus 500 according to an embodiment of the present invention. The operations in FIG. 9 may be performed by a processor 560 of the position detection apparatus 500.

FIG. 9 shows that the position detection apparatus 500 acquires information about the sensing area (S910). For example, the sensing area 731 is at the left end of the entire area 730 in which the position detection portion 530 is configured, as illustrated in FIG. 7, in the first mode, the sensing area 731 is at the right end of the entire area 730, as illustrated in FIG. 8, in the second mode, and the entire area 730 is set as the sensing area 731 in the third mode. The position detection apparatus 500 may acquire information about one of these modes.

At this time, the position detection apparatus 500 may retrieve pre-stored information about the sensing area from memory or receive information about the sensing area through user input, which is provided through an input and output interface that allows the selection of a sensing area on the display screen.

At this time, the position detection apparatus 500 may set the area in which an object is first sensed in the entire area 730 to be the sensing area. For example, the first mode may operate when an object approaches from the right end, and the second mode may operate when the object approaches from the left end.

Further, the position detection apparatus 500 visualizes the sensing area 731 using a light-emitting element 540 (S920). For example, the light-emitting element 540 may emit light only in the area corresponding to the sensing area 731 or may emit light throughout the entire area 730 in which the position detection portion 530 is configured. However, the sensing area may be visualized by having the light-emitting element 540 that emits light in the sensing area 731 emit light in the area other than the sensing area 731 in a color different from the color of the sensing area 731.

Further, the position detection apparatus 500 displays at least one menu icon on the display screen (S930). For example, the position detection apparatus 500 may display a plurality of menu icons 711, 712, 713, 714, 715, 716 on the display screen 710 as illustrated in FIG. 7.

Further, the position detection apparatus 500 detects the position of a finger in the sensing area 731 (S940) and reflects the detected finger position in the menu icon on the display screen.

At this time, the horizontal length of the display screen 710 may be different from the horizontal length of the sensing area 731, and the sensitivity with which the position detection result of an object's position is reflected on the display screen may be set based on the ratio of the horizontal length of the sensing area 731 to the horizontal length of the entire display screen 710.

For example, when a finger is positioned in front of the left end of the sensing area 731, a pointer (not shown) for selecting an on-screen menu icon may point to the left end of the display screen 710. Similarly, when a finger is positioned in front of the right end of the sensing area 731, the pointer may point to the right end of the display screen 710. Further, when the finger is positioned in front of the center of the sensing area 731, the pointer may point to the center of the display screen 710.

At this time, the pointer may have various shapes and may be configured in an arrow shape, for example.

At this time, information about the menu pointed to by the finger may be displayed by changing the shape or color of the menu icon forming the display screen 710, without the pointer being displayed on the screen.

For example, every time the user's finger moves right or left in the sensing area 731, one of a plurality of menu icons 711, 712, 713, 714, 715, 716 may increase in size and change colors. For example, when the finger is positioned in an area corresponding to the NAV menu icon 712 in the sensing area 731, the NAV menu icon 712 may increase in size or change its colors as illustrated in FIG. 7.

Further, the position detection apparatus 500 determines whether an input is received (S960) through the physical button 550 and performs a function that matches the detected object's position when an input is received through the physical button 550 (S970).

The physical button 550 is embedded inside the sensor portion 520 and is integrally provided with a sensor having a plurality of linearly arranged sensing elements physically, that is, the position detection portion 530.

At this time, the physical button 550 may be set to execute a preset function when the user presses the sensor portion 530 with a force equal to or greater than a threshold pressure.

For example, the navigation application may be set to be executed when the user presses the physical button 550 with a force equal to or greater than the threshold pressure while the NAV menu icon 712 is activated.

At this time, the function that matches the detected object's position may be determined by the position of the finger immediately before an input is received through the physical button. For example, FIG. 7 shows that the navigation application may be set to be executed when an input is received through the physical button 550 while the NSV menu icon 712 is activated as a result of the position detection of the finger.

When an input is not received through the physical button 550 in S960, the position detection apparatus 500 may continue to detect the finger position (S940) and reflect the detected finger position in the menu icon on the display screen.

Figure 10:
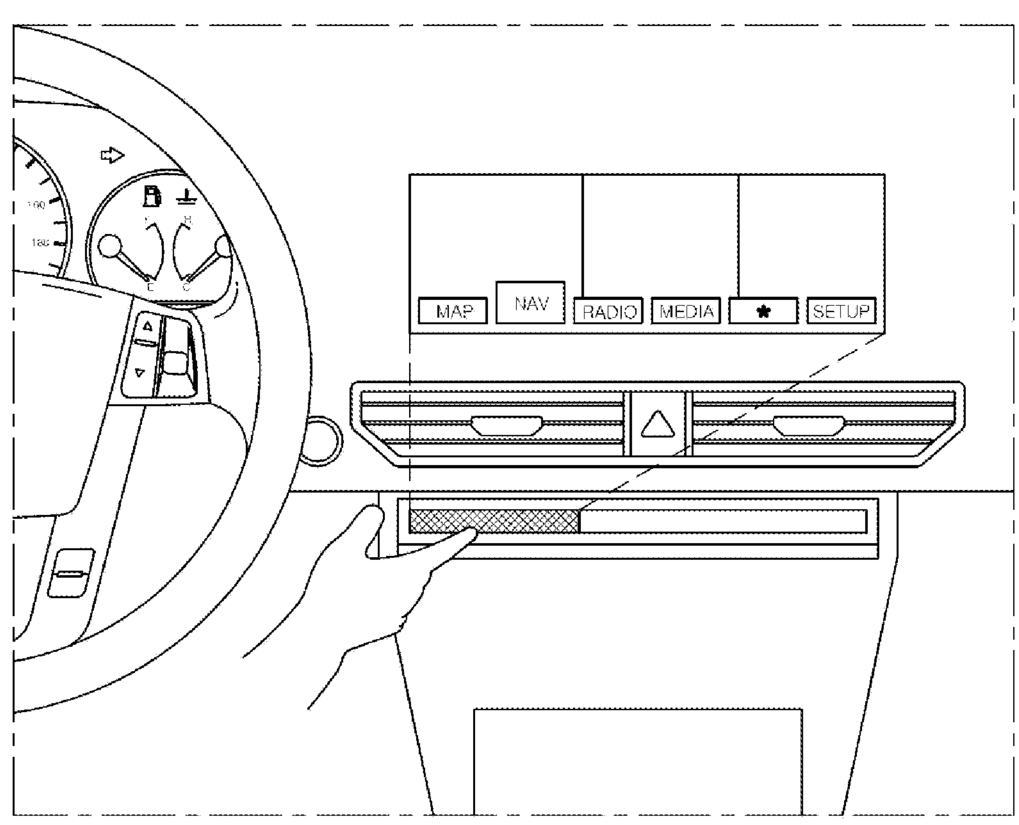
FIG. 10 illustrates an example of a position detection apparatus applied to the interior of a vehicle according to an embodiment of the present invention.

FIG. 10 illustrates an example of a position detection apparatus applied to the interior of a vehicle according to an embodiment of the present invention.

FIG. 10 shows that the display portion 510 and the sensor portion 520 in the position detection apparatus 500 are detached from each other so that the driver can reach the sensing area of the sensor portion 520 without stretching his arm high to the screen of the display portion 510 and can operate the entire horizontal screen of the display portion 510 without using the entire horizontal area of the sensor portion 520.

According to the various embodiments of the present invention described thus far, drivers can operate buttons safely without looking down while driving.

Further, the short maneuvering range of the driver's arm covers the entire range of the menu on the monitor so that the driver can operate the buttons comfortably without overstretching the arm.

What is claimed is:

1. A method of detecting a position of an object using a position detection apparatus, the method comprising:
- determining a sensing area used to detect the position of the object within an entire area that is formed by a sensor having a plurality of linearly arranged sensing elements and in which the position of the object may be detected;
- visualizing the sensing area using a light-emitting element;
- detecting the position of the object in the sensing area;
- displaying the detected position of the object on a display screen,
- determining whether an input is received through a physical button integrally provided with a sensor having a plurality of linearly arranged sensing elements; and
- performing a function that matches the detected object when an input is received through the physical button.

2. The method of claim 1, wherein, in the determining whether an input is received through the physical button, it is determined that an input is received through the physical button when a user presses the physical button with a force equal to or greater than a threshold force, and wherein a detection result of the position of the object is reflected on the display screen according to a ratio of a horizontal length of the display screen to a horizontal length of the sensing area.

3. The method of claim 1, wherein the function that matches the detected position of the object is determined by the position of the object received immediately before an input is received through the physical button.

4. The method of claim 1, wherein the displaying of the detected position of the object on the display screen includes activating one of at least one menu icon according to the detected position of the object on the display screen on which the at least one menu icon is displayed, wherein executing the function that matches the detected position of the object is executing an application that matches the activated menu icon.

5. The method of claim 4, wherein, the activating of one of the at least one menu icon includes changing a color or a shape of the one of the at least one menu icon.

6. A position detection apparatus comprising:
- a display portion configured to display information on a screen;
- a sensor portion using all or a part of an entire area, which entire area is formed by a sensor having a plurality of linearly arranged sensing elements and in which the position of an object may be detected, as a sensing area for detecting the position of the object, wherein the sensing area is variably set within the entire area;
- a light-emitting element configured to visualize the sensing area; and a processor configured to determine the sensing area and to control the display portion to display a detection result of the position of the object on the screen, wherein:

a detection result of the position of the object is reflected on the screen by scaling the detected position according to a ratio of a horizontal length of the screen to a horizontal length of the sensing area, the horizontal length of the screen and a horizontal direction of the sensing area are parallel to each other, and the processor is configured to determine whether an input is received through a physical button integrally provided with a sensor having a plurality of linearly arranged sensing elements and to perform a function that corresponds to the detected position of the object when an input is received through the physical button.

7. The apparatus of claim 6, wherein the processor is configured to determine that an input is received through the physical button when a user presses the physical button with a force equal to or greater than a threshold force.

8. The apparatus of claim 6, wherein the function that matches the detected position of the object is determined by the position of the object received immediately before an input is received through the physical button.

9. The apparatus of claim 6, wherein the processor is configured to activate one of at least one menu icon according to the detected position of the object on the display screen on which the at least one menu icon is displayed and to perform a function that matches the detected position of the object by executing an application that matches the activated menu icon.

10. The apparatus of claim 9, wherein the processor is configured to activate one of the at least one menu icon by changing a shape or color of the one of the at least one menu icon.

* * * * *